(12) United States Patent
Taylor

(10) Patent No.: US 8,866,470 B2
(45) Date of Patent: Oct. 21, 2014

(54) PERMANENT MAGNET INCLINOMETER FOR AN INDUSTRIAL MACHINE

(75) Inventor: Wesley P. Taylor, Glendale, WI (US)

(73) Assignee: Harnischfeger Technologies, Inc., Wilmington, DE (US)

( * ) Notice: Subject to any disclaimer, the term of this patent is extended or adjusted under 35 U.S.C. 154(b) by 376 days.

(21) Appl. No.: 13/330,220

(22) Filed: Dec. 19, 2011

(65) Prior Publication Data

US 2013/0154624 A1    Jun. 20, 2013

(51) Int. Cl.
G01B 7/30 (2006.01)
G01C 9/06 (2006.01)

(52) U.S. Cl.
CPC .......................................... *G01C 9/06* (2013.01)
USPC ....................................................... 324/207.25

(58) Field of Classification Search
None
See application file for complete search history.

(56) References Cited

U.S. PATENT DOCUMENTS

| | | | |
|---|---|---|---|
| 4,509,376 A | 4/1985 | Thomasson | |
| 4,589,518 A | 5/1986 | Kohzai et al. | |
| 4,614,041 A | 9/1986 | Darton et al. | |
| 6,543,578 B1 | 4/2003 | Merz | |
| 6,857,706 B2 | 2/2005 | Hames et al. | |
| 7,071,682 B2 * | 7/2006 | Schroeder | 324/207.24 |
| 7,221,151 B2 * | 5/2007 | Schroeder et al. | 324/207.24 |
| 7,521,933 B2 * | 4/2009 | Mercer | 324/326 |
| 7,555,841 B2 | 7/2009 | Steinich | |
| 7,615,993 B2 | 11/2009 | Takahashi | |
| 2009/0222176 A1 | 9/2009 | Florean et al. | |
| 2010/0315070 A1 | 12/2010 | Hong | |

FOREIGN PATENT DOCUMENTS

| | | |
|---|---|---|
| JP | 58021113 | 2/1983 |
| JP | 2003148999 | 5/2003 |
| JP | 2008002842 | 1/2008 |
| WO | 2009135734 | 11/2009 |

OTHER PUBLICATIONS

SMART Position Sensor, 75 mm Linear Configuration Application Note, Honeywell International, Inc., Dec. 2009.

* cited by examiner

*Primary Examiner* — Paresh Patel
(74) *Attorney, Agent, or Firm* — Michael Best & Friedrich LLP

(57) ABSTRACT

Permanent magnet inclinometer for an industrial machine. The industrial machine includes a component movable with respect to the industrial machine that includes a first permanent magnet and a second permanent magnet. A circular magnetic sensor array senses a first magnetic flux associated with the first permanent magnet and a second magnetic flux associated with the second permanent magnet. The circular magnetic sensor array includes a first magnetic sensor that senses the first magnetic flux and a second magnetic sensor that senses the second magnetic flux. The controller receives a first flux signal related to the first magnetic flux and a second flux signal related to the second magnetic flux, analyzes the first flux signal to identify a first peak magnetic flux, and analyzes the second flux signal to identify a second peak magnetic flux. The controller then determines the inclination of the component of the industrial machine based on the first peak magnetic flux and the second peak magnetic flux.

7 Claims, 7 Drawing Sheets

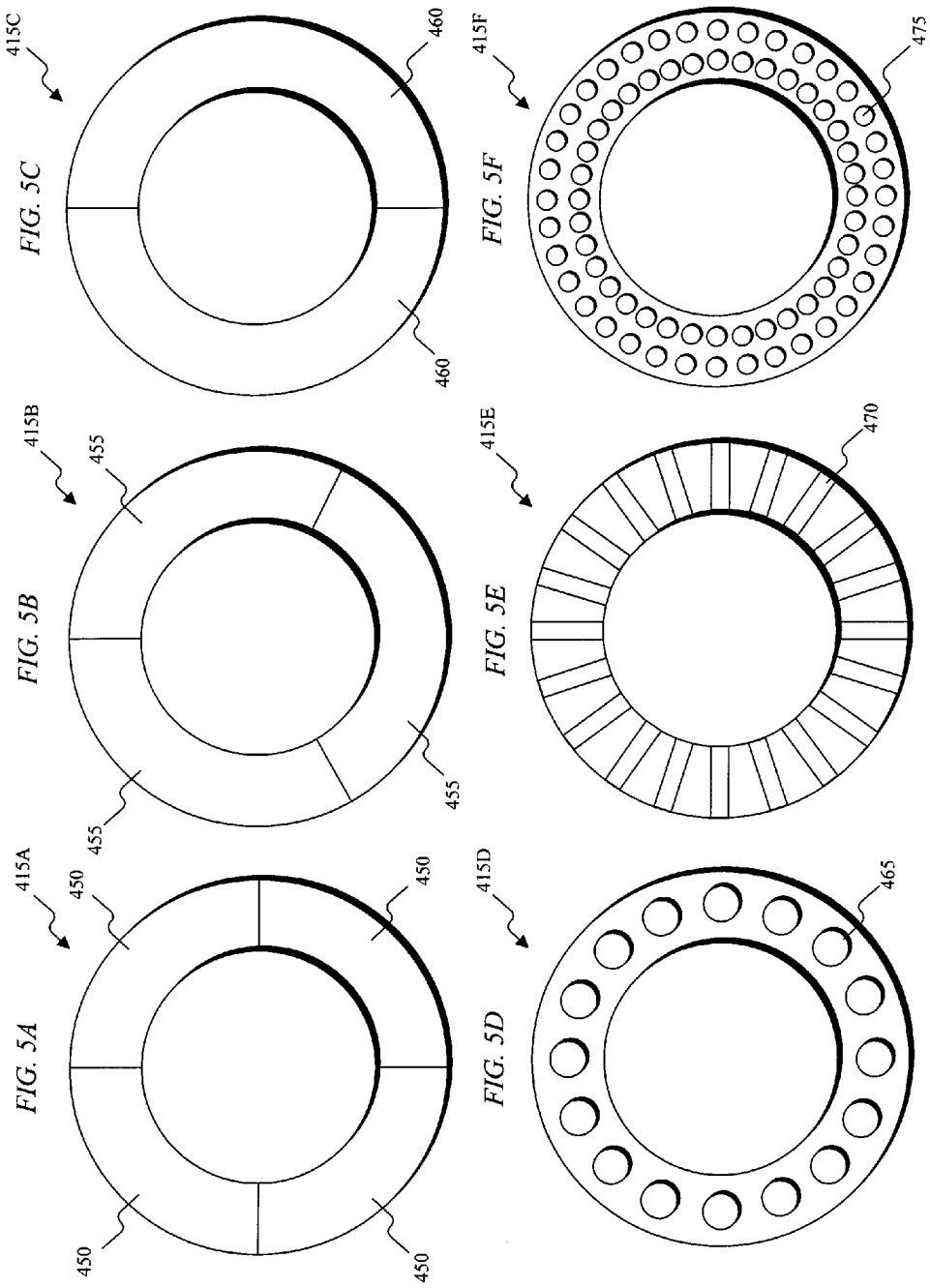

PERMANENT MAGNET INCLINOMETER FOR AN INDUSTRIAL MACHINE

BACKGROUND

This invention relates to an inclinometer. Microelectromechanical systems ("MEMS") are often used to measure inclination. However, MEMS include small moving parts that are susceptible to shock and vibration, which can adversely affect the MEMS ability to accurately measure inclination.

SUMMARY

The invention described herein provides a magnetic inclinometer that can be used to determine the inclination of, for example, a dipper handle, a boom, or another component of an industrial machine. The inclination of the component of the industrial machine is used by, for example, a collision avoidance system, a payload determination system, a position detection system associated with the industrial machine. The inclinometer includes an array of magnets (e.g., permanent magnets) mounted or otherwise coupled to the component of the industrial machine. A circular magnetic sensor array (e.g., an array of Hall Effect sensors or other magnetic detectors) is provided in proximity to the magnets. The magnetic sensor array is connected to a controller that receives signals from the magnetic sensor array associated with a detected characteristic (e.g., magnetic flux) of one or more of the magnets. The controller processes the signals received from the sensor array. Based on which sensors in the sensor array detected the characteristic (or magnitude of the characteristic) of the magnets, the controller determines or calculates an inclination of the component of the industrial machine. Such an inclinometer is capable of determining the inclination of the component of the industrial machine based on linear movements of the component, rotational movements of the component, or a combination of linear and rotational movements of the component of the industrial machine. Additionally, because the permanent magnets and magnetic sensors do not include any moving parts, they are not susceptible to errors caused by vibration and shock.

In one embodiment, the invention provides a method of determining an inclination of a component of an industrial machine. The component of the industrial machine is independently movable in a linear manner and a rotary manner. The method includes sensing a first magnetic flux associated with a first magnetic sensor, sensing a second magnetic flux associated with a second magnetic sensor, and generating a first flux signal related to the first magnetic flux and a second flux signal related to the second magnetic flux. The method also includes analyzing the first flux signal to identify a first peak magnetic flux, analyzing the second flux signal to identify a second peak magnetic flux, and identifying a magnetic sensor path based on the first peak magnetic flux and the second peak magnetic flux. The inclination of the component of the industrial machine is then determined based on the identified magnetic sensor path.

In another embodiment, the invention provides an industrial machine. The industrial machine includes a component, a circular magnetic sensor array, and a controller. The component is movable in a linear manner or a rotary manner with respect to the industrial machine. The component includes a first permanent magnet and a second permanent magnet. The circular magnetic sensor array is configured to sense a first magnetic flux associated with the first permanent magnet and a second magnetic flux associated with the second permanent magnet. The circular magnetic sensor array includes a first magnetic sensor configured to sense the first magnetic flux associated with the first permanent magnet and a second magnetic sensor configured to sense the second magnetic flux associated with the second permanent magnet. The controller is configured to receive a first flux signal related to the first magnetic flux and a second flux signal related to the second magnetic flux, analyze the first flux signal to identify a first peak magnetic flux, and analyze the second flux signal to identify a second peak magnetic flux. The controller is also configured to determine the inclination of the component of the industrial machine based on the first peak magnetic flux and the second peak magnetic flux.

In another embodiment, the invention provides a method of determining inclination. The method includes sensing a first magnetic flux associated with a first permanent magnetic, sensing a second magnetic flux associated with a second permanent magnetic, generating a first flux signal related to the first magnetic flux, and generating a second flux signal related to the second magnetic flux. The method also includes identifying a first peak magnetic flux associated with the first flux signal, identifying a second peak magnetic flux associated with the second flux signal, and determining inclination based on the first peak magnetic flux and the second peak magnetic flux.

Other aspects of the invention will become apparent by consideration of the detailed description and accompanying drawings.

BRIEF DESCRIPTION OF THE DRAWINGS

FIGS. 5A-5F illustrate sensor arrays according to embodiments of the invention.

DETAILED DESCRIPTION

Figure 1:
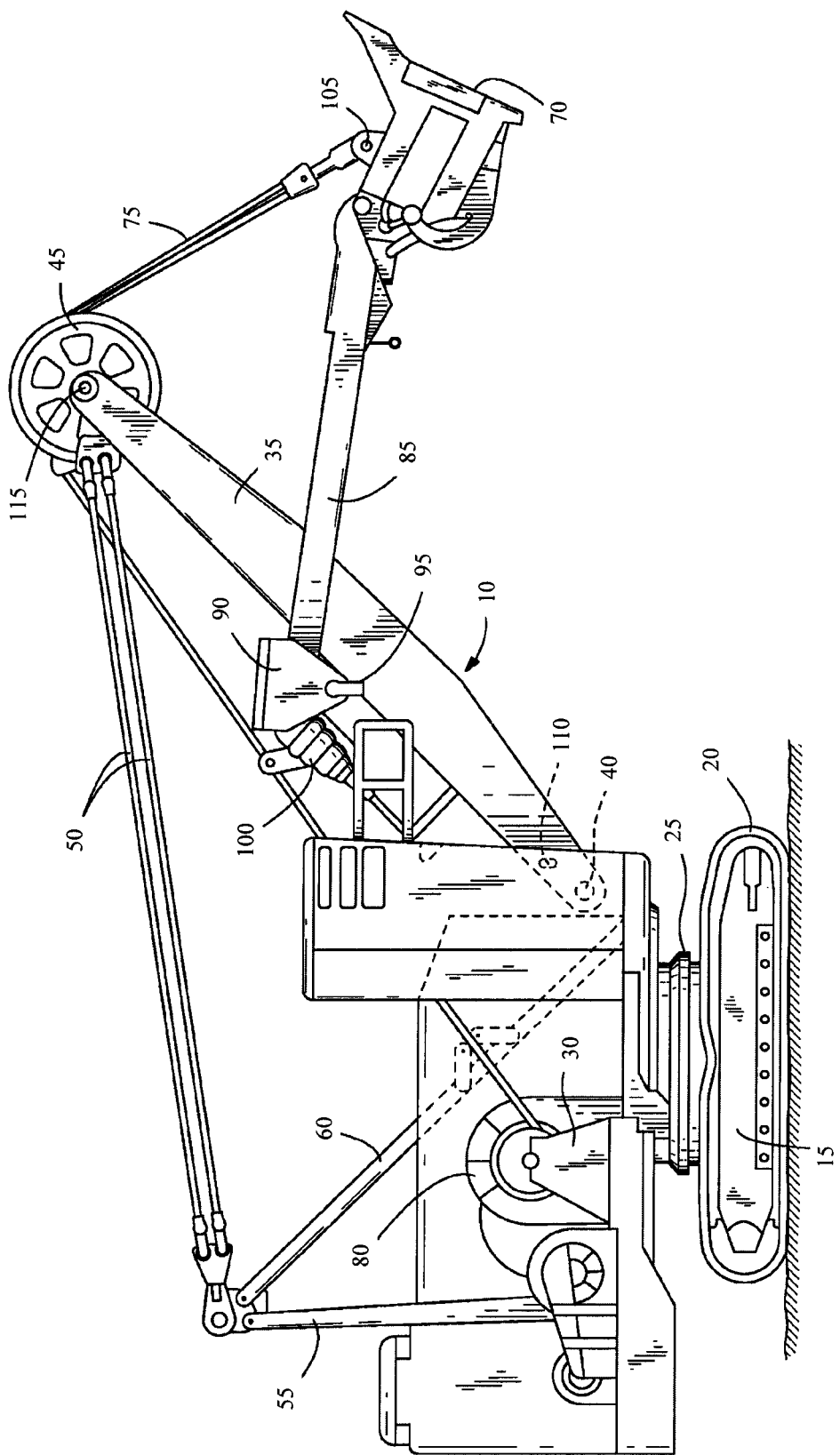
FIG. 1 illustrates an industrial machine according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

The invention described herein relates to the control of an industrial machine (e.g., a mining machine, a crane, an end loader, a skid loader, a backhoe, etc.) configured to, among other things, raise and lower a load. Controlling the industrial machine includes determining, among other things, the orientation of the industrial machine, the position of the components of the industrial machine, and relative angles of the components of the industrial machine with respect to one another. For example, the industrial machine can include one or more inclinometers that can be used to determine the inclination of, for example, a dipper handle, a boom, or another component of the industrial machine. The inclination of the component of the industrial machine can be used by a variety of control systems associated with the industrial machine for the purpose of collision avoidance, payload determination, position detection, etc. The inclinometers can include an array of magnets (e.g., permanent magnets) mounted or otherwise coupled to a component of the industrial machine. A circular magnetic sensor array (e.g., an array of Hall Effect sensors or other magnetic detectors) is provided proximately to the magnets. The sensor array detects a characteristic (e.g., magnetic flux) associated with the magnets and is connected to a controller that receives signals from the magnetic sensor array related to the characteristic. The controller then processes the signals received from the sensor array. Based on which sensors in the sensor array detected the characteristic associated with the magnets, the controller determines or calculates an inclination of the component of the industrial machine. Such an inclinometer is capable of determining the inclination of the component of the industrial machine based on linear movements of the component, rotational movements of the component, or a combination of linear and rotational movements of the component of the industrial machine.

Although the invention described herein can be applied to, performed by, or used in conjunction with a variety of industrial machines (e.g., an electric rope shovel, draglines, end loaders, skid loaders, backhoes, cranes, etc.), embodiments of the invention are described herein with respect to an electric rope or power shovel, such as the power shovel 10 shown in FIG. 1. The shovel 10 includes a mobile base 15, drive tracks 20, a turntable 25, a machinery deck 30, a boom 35, a lower end 40, a sheave 45, tension cables 50, a back stay 55, a stay structure 60, a dipper 70, a hoist rope 75, a winch drum 80, dipper arm or handle 85, a saddle block 90, a pivot point 95, a transmission unit 100, a bail pin 105, and an inclinometer 32.

The mobile base 15 is supported by the drive tracks 20. The mobile base 15 supports the turntable 25 and the machinery deck 30. The turntable 25 is capable of 360-degrees of rotation about the machinery deck 30 relative to the mobile base 15. The boom 35 is pivotally connected at the lower end 40 to the machinery deck 30. The boom 35 is held in an upwardly and outwardly extending relation to the deck by the tension cables 50 which are anchored to the back stay 55 of the stay structure 60. The stay structure 60 is rigidly mounted on the machinery deck 30. The sheave 45 is rotatably mounted on the upper end of the boom 35.

The dipper 70 is suspended from the boom 35 by the hoist rope 75. The hoist rope 75 is wrapped over the sheave 45 and attached to the dipper 70 at the bail pin 105. The hoist rope 75 is anchored to the winch drum 80 of the machinery deck 30. As the winch drum 80 rotates, the hoist rope 75 is paid out to lower the dipper 70 or pulled in to raise the dipper 70. The dipper 70 also includes the dipper handle 85 rigidly attached thereto. The dipper arm 85 is slidably supported in a saddle block 90, and the saddle block 90 is pivotally mounted to the boom 35 at the pivot point 95. The dipper handle 85 includes a rack tooth formation thereon which engages a drive pinion mounted in the saddle block 90. The drive pinion is driven by an electric motor and transmission unit 100 to extend or retract the dipper arm 85 relative to the saddle block 90.

An electrical power source is mounted to the machinery deck 30 to provide power to one or more hoist electric motors for drive the winch drum 80, one or more crowd electric motors to drive the saddle block transmission unit 100, and one or more swing electric motors to turn the turntable 25. Each of the crowd, hoist, and swing motors are driven by its own motor controller or drive in response to control voltages and currents corresponding to operator commands.

Figure 2:
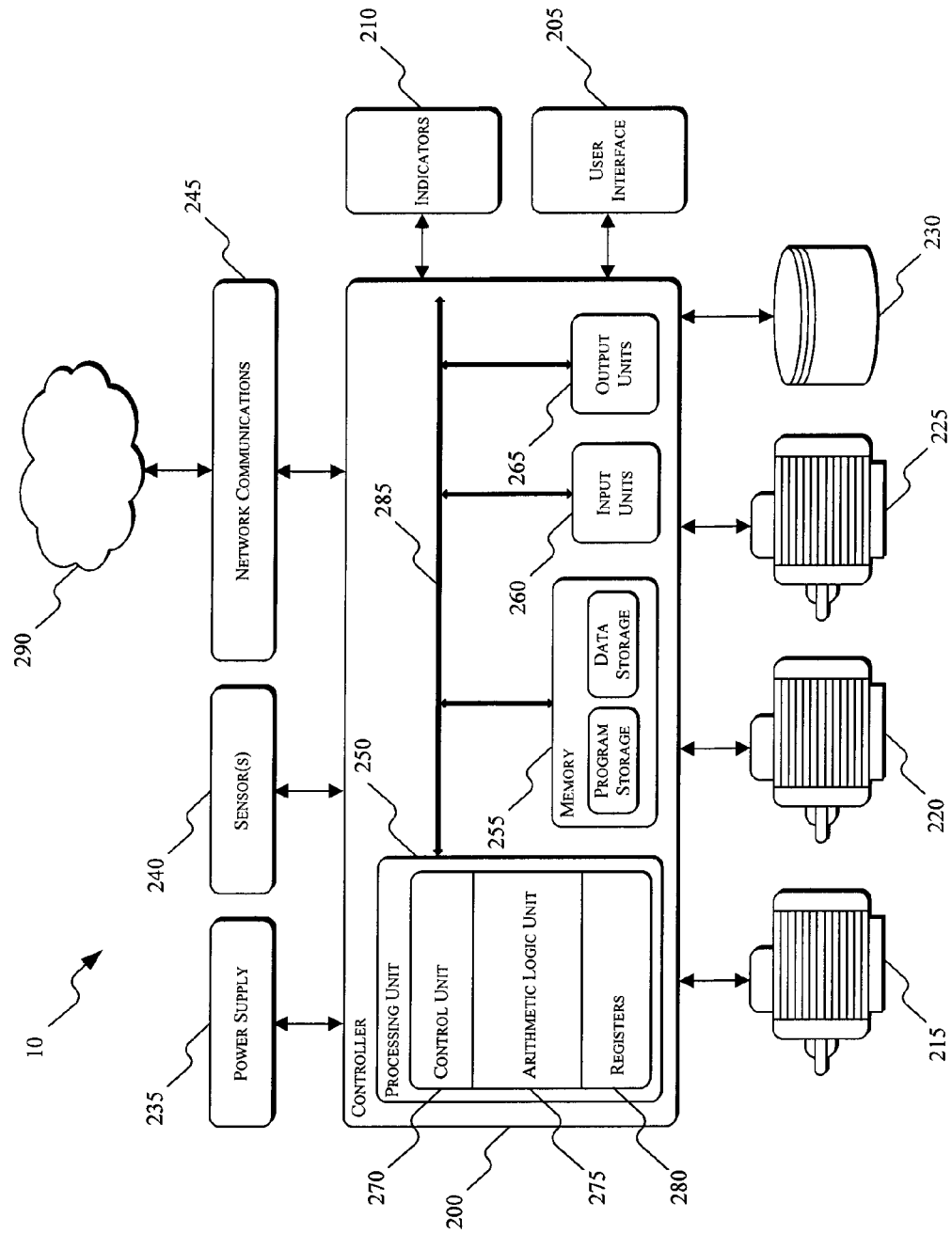
FIG. 2 illustrates a controller according to an embodiment of the invention.

FIG. 2 illustrates a controller 200 associated with the power shovel 10 of FIG. 1. The controller 200 is electrically and/or communicatively connected to a variety of modules or components of the shovel 10. For example, the illustrated controller 200 is connected to one or more indicators 205, a user interface module 210, one or more hoist motors and hoist motor drives 215, one or more crowd motors and crowd motor drives 220, one or more swing motors and swing motor drives 225, a data store or database 230, a power supply module 235, one or more sensors 240, and a network communications module 245. The controller 200 includes combinations of hardware and software that are operable to, among other things, control the operation of the power shovel 10, control the position of the boom 35, the dipper arm 85, the dipper 70, etc., activate the one or more indicators 205 (e.g., a liquid crystal display ["LCD"]), monitor the operation of the shovel 10, etc. The one or more sensors 240 include, among other things, a loadpin strain gauge, one or more inclinometers, gantry pins, one or more motor field modules, etc. The loadpin strain gauge includes, for example, a bank of strain gauges positioned in an x-direction (e.g., horizontally) and a bank of strain gauges positioned in a y-direction (e.g., vertically) such that a resultant force on the loadpin can be determined. In some embodiments, a crowd drive other than a crowd motor drive can be used (e.g., a crowd drive for a single legged handle, a stick, a hydraulic cylinder, etc.).

In some embodiments, the controller 200 includes a plurality of electrical and electronic components that provide power, operational control, and protection to the components and modules within the controller 200 and/or shovel 10. For example, the controller 200 includes, among other things, a processing unit 250 (e.g., a microprocessor, a microcontroller, or another suitable programmable device), a memory 255, input units 260, and output units 265. The processing unit 250 includes, among other things, a control unit 270, an arithmetic logic unit ("ALU") 275, and a plurality of registers 280 (shown as a group of registers in FIG. 2), and is implemented using a known computer architecture, such as a modified Harvard architecture, a von Neumann architecture, etc. The processing unit 250, the memory 255, the input units 260, and the output units 265, as well as the various modules connected to the controller 200 are connected by one or more control and/or data buses (e.g., common bus 285). The control and/or data buses are shown generally in FIG. 2 for illustrative purposes. The use of one or more control and/or data buses for the interconnection between and communication among the various modules and components would be known to a person skilled in the art in view of the invention described herein. In some embodiments, the controller 200 is implemented partially or entirely on a semiconductor (e.g., a field-programmable gate array ["FPGA"] semiconductor) chip, such as a chip developed through a register transfer level ("RTL") design process.

The memory 255 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 250 is connected to the memory 255 and executes software instructions that are capable of being stored in a RAM of the memory 255 (e.g., during execution), a ROM of the memory 255 (e.g., on a generally permanent basis), or another non-transitory computer readable medium such as another memory or a disc. Software included in the implementation of the shovel 10 can be stored in the memory 255 of the controller 200. The software includes, for example, firmware, one or more applications, program data, filters, rules, one or more program modules, and other executable instructions. The controller 200 is configured to retrieve from memory and execute, among other things, instructions related to the control processes and methods described herein. In other constructions, the controller 200 includes additional, fewer, or different components.

The network communications module 245 is configured to connect to and communicate through a network 290. In some embodiments, the network is, for example, a wide area network ("WAN") (e.g., a TCP/IP based network, a cellular network, such as, for example, a Global System for Mobile Communications ["GSM"] network, a General Packet Radio Service ["GPRS"] network, a Code Division Multiple Access ["CDMA"] network, an Evolution-Data Optimized ["EV-DO"] network, an Enhanced Data Rates for GSM Evolution ["EDGE"] network, a 3GSM network, a 4GSM network, a Digital Enhanced Cordless Telecommunications ["DECT"] network, a Digital AMPS ["IS-136/TDMA"] network, or an Integrated Digital Enhanced Network ["iDEN"] network, etc.).

In other embodiments, the network 290 is, for example, a local area network ("LAN"), a neighborhood area network ("NAN"), a home area network ("HAN"), or personal area network ("PAN") employing any of a variety of communications protocols, such as Wi-Fi, Bluetooth, ZigBee, etc. Communications through the network 290 by the network communications module 245 or the controller 200 can be protected using one or more encryption techniques, such as those techniques provided in the IEEE 802.1 standard for port-based network security, pre-shared key, Extensible Authentication Protocol ("EAP"), Wired Equivalency Privacy ("WEP"), Temporal Key Integrity Protocol ("TKIP"), Wi-Fi Protected Access ("WPA"), etc. The connections between the network communications module 245 and the network 290 are, for example, wired connections, wireless connections, or a combination of wireless and wired connections. Similarly, the connections between the controller 200 and the network 290 or the network communications module 245 are wired connections, wireless connections, or a combination of wireless and wired connections. In some embodiments, the controller 200 or network communications module 245 includes one or more communications ports (e.g., Ethernet, serial advanced technology attachment ["SATA"], universal serial bus ["USB"], integrated drive electronics ["IDE"], etc.) for transferring, receiving, or storing data associated with the shovel 10 or the operation of the shovel 10.

The power supply module 235 supplies a nominal AC or DC voltage to the controller 200 or other components or modules of the shovel 10. The power supply module 235 is powered by, for example, a power source having nominal line voltages between 100V and 240V AC and frequencies of approximately 50-60 Hz. The power supply module 235 is also configured to supply lower voltages to operate circuits and components within the controller 200 or shovel 10. In other constructions, the controller 200 or other components and modules within the shovel 10 are powered by one or more batteries or battery packs, or another grid-independent power source (e.g., a generator, a solar panel, etc.).

The user interface module 210 is used to control or monitor the power shovel 10. For example, the user interface module 210 is operably coupled to the controller 200 to control the position of the dipper 70, the position of the boom 35, the position of the dipper handle 85, the transmission unit 100, etc. The user interface module 210 includes a combination of digital and analog input or output devices required to achieve a desired level of control and monitoring for the shovel 10. For example, the user interface module 210 includes a display (e.g., a primary display, a secondary display, etc.) and input devices such as touch-screen displays, a plurality of knobs, dials, switches, buttons, etc. The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. The user interface module 210 can also be configured to display conditions or data associated with the power shovel 10 in real-time or substantially real-time. For example, the user interface module 210 is configured to display measured electrical characteristics of the power shovel 10, the status of the power shovel 10, the position of the dipper 70, the position of the dipper handle 85, etc. In some implementations, the user interface module 210 is controlled in conjunction with the one or more indicators 205 (e.g., LEDs, speakers, etc.) to provide visual or auditory indications of the status or conditions of the power shovel 10.

Figure 3:
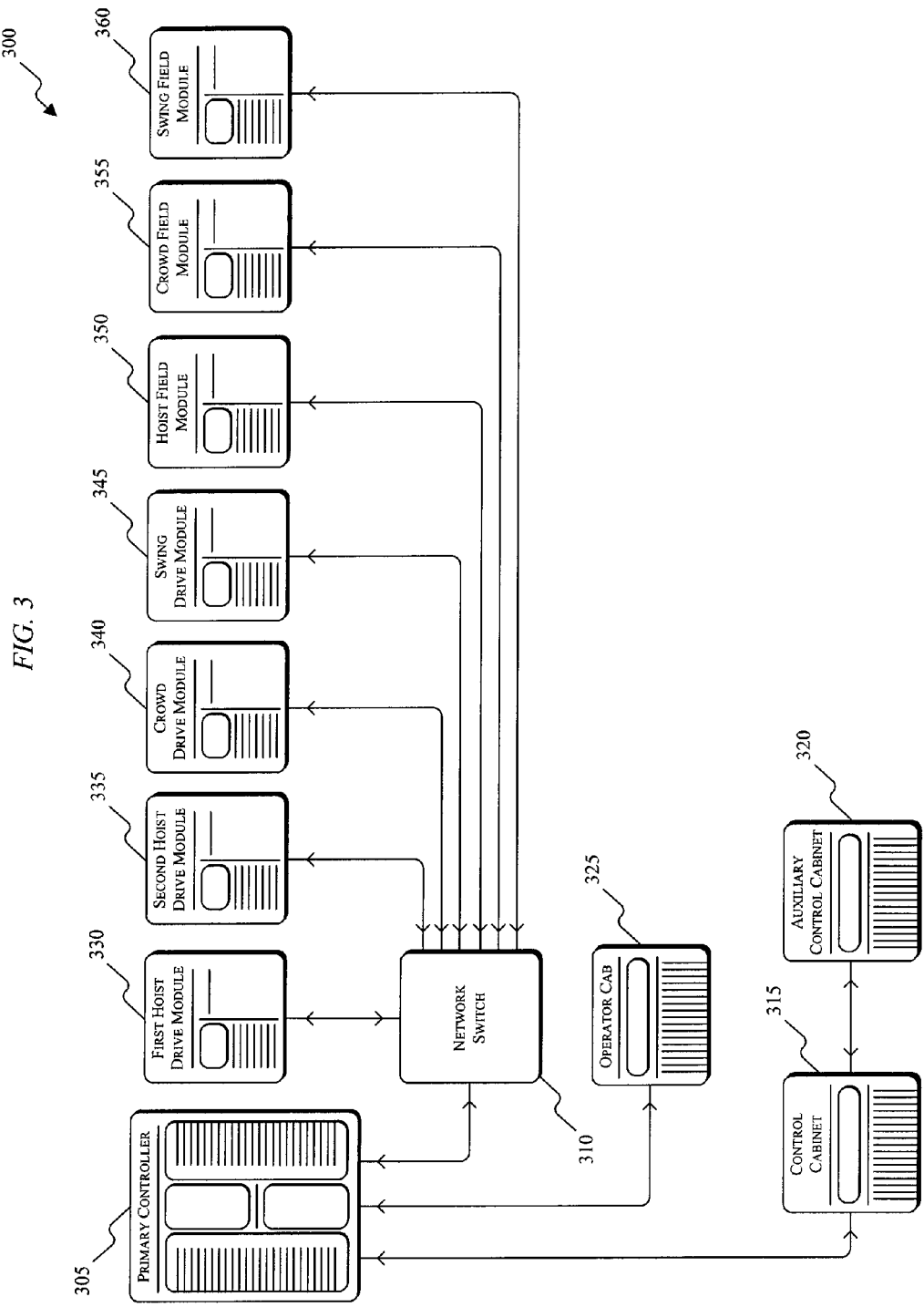
FIG. 3 illustrates a control system for an industrial machine according to an embodiment of the invention.

FIG. 3 illustrates a more detailed control system 300 for the power shovel 10. For example, the power shovel 10 includes a primary controller 305, a network switch 310, a control cabinet 315, an auxiliary control cabinet 320, an operator cab 325, a first hoist drive module 330, a second hoist drive module 335, a crowd drive module 340, a swing drive module 345, a hoist field module 350, a crowd field module 355, and a swing field module 360. The various components of the control system 300 are connected by and communicate through, for example, a fiber-optic communication system utilizing one or more network protocols for industrial automation, such as process field bus ("PROFIBUS"), Ethernet, ControlNet, Foundation Fieldbus, INTERBUS, controller-area network ("CAN") bus, etc. The control system 300 can include the components and modules described above with respect to FIG. 2. For example, the motor drives 225 can correspond to the hoist, crowd, and swing drives 330, 335, and 340, the user interface 205 and the indicators 210 can be included in the operator cab 325, etc. The loadpin strain gauge can provide electrical signals indicative of forces applied to the loadpin to the primary controller 305, the controller cabinet 315, the auxiliary cabinet 320, etc.

The first hoist drive module 330, the second hoist drive module 335, the crowd drive module 340, and the swing drive module 345 are configured to receive control signals from, for example, the primary controller 305 to control hoisting, crowding, and swinging operations of the shovel 10. The control signals are associated with drive signals for hoist, crowd, and swing motors 225A, 225B, and 225C of the shovel 10. As the drive signals are applied to the motors 225A, 225B, and 225C, the outputs (e.g., electrical and mechanical outputs) of the motors are monitored and fed back to the primary controller 305. The outputs of the motors include, for example, motor speed, motor torque, motor power, motor current, etc. Based on these and other signals associated with the shovel (e.g., signals from one or more inclinometers), the primary controller 305 is configured to determine or calculate one or more operational states or positions of the shovel 10 or its components. In some embodiments, the primary controller 305 determines a dipper position, a hoist wrap angle, a hoist motor's rotations per minute ("rpm"), a crowd motor's rpm, a dipper speed, a dipper acceleration, dipper handle angle, etc.

Figure 4:
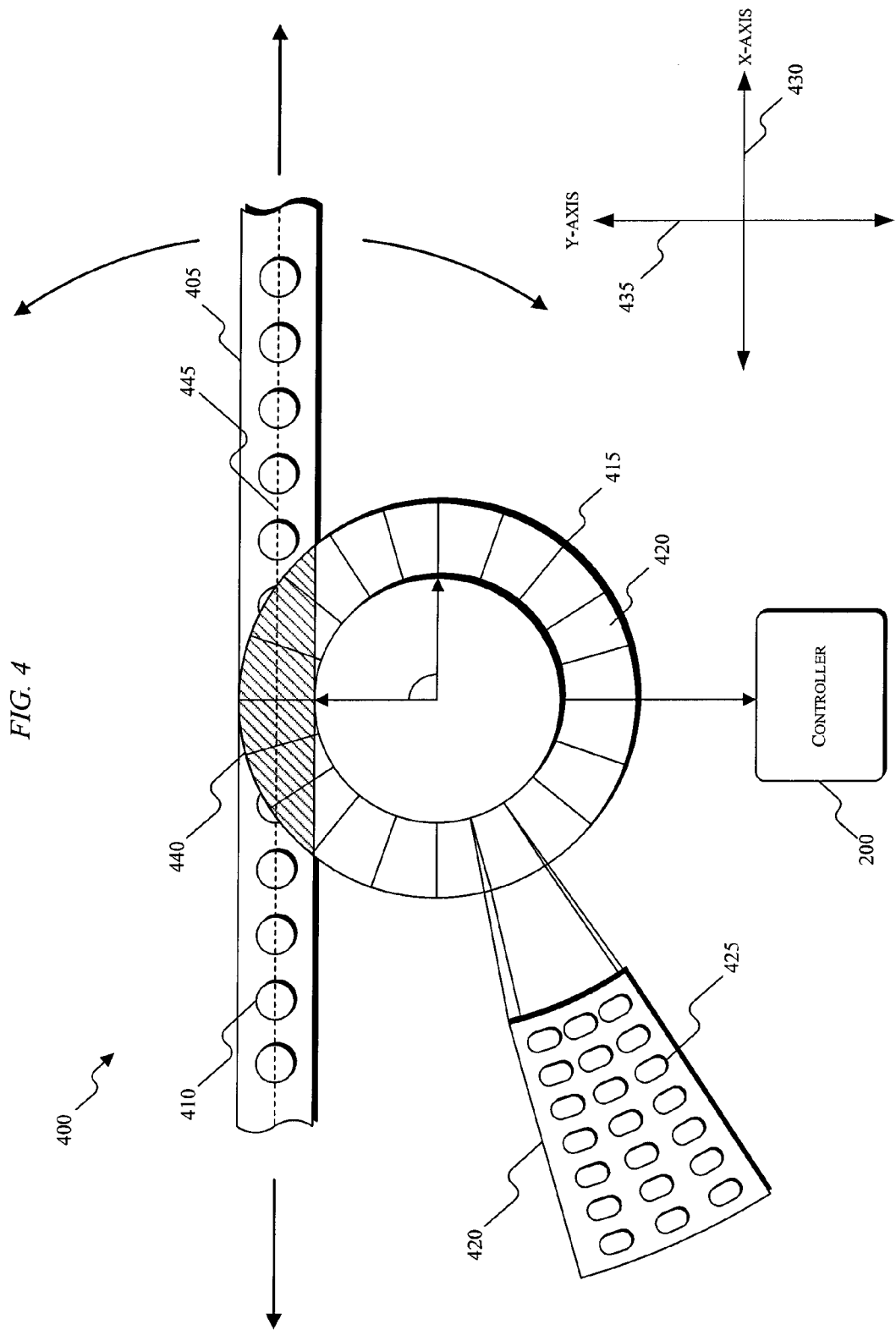
FIG. 4 illustrates a circular magnetic inclinometer system according to an embodiment of the invention.

The primary controller 305 or the controller 200 is connected to a circular magnetic inclinometer system 400, as illustrated in FIG. 4. For example, in the illustrated embodiment, the system 400 includes the controller 200, a component 405 of the industrial machine, a plurality of magnets (e.g., permanent magnets) 410, a circular magnetic sensory array 415, and a plurality of magnetic sensors 420. The magnetic sensors 420 are, for example, groups or sets of magnetic detectors 425 (e.g., Hall Effect sensors, magnetometers, or another suitable detector) configured to detect magnetic fields or magnetic flux (i.e., the measure of a magnetic field or magnetic flux density passing through a given surface). References made herein to "a magnetic sensor 420" are made with respect to embodiments of the invention that include a plurality of detectors 425 per sensor 420, although sensors 420 that include a single detector 425 can be used in other embodiments. The component of the industrial machine 405 is, for example, the boom 35, the dipper handle 85, etc, shown in FIG. 1. Embodiments of the system 400 are described herein with respect to the component 405 of the industrial machine 10 being the dipper handle 85. The component 405 is configured for movement in both a linear direction (e.g., with respect to an x-axis 430 or generally horizontal direction) and rotational movement (e.g., movement with respect to both the x-axis 430 and a y-axis 430 [i.e., in a generally vertical direction]). In some embodiments, the component 405 is also configured for movement in the linear direction and rotational movement at the same time. The movement of the component 405 is dependent upon, for example, the selective application of hoist and crowd forces during the operation of the industrial machine 10.

In some embodiments, each of the plurality of magnetic sensors 420 is individually connected to the controller 200. In other embodiments, the output of each of the plurality of magnetic sensors 420 are multiplexed or otherwise combined for transmission to the controller 200. In the illustrated embodiment, the circular magnetic sensor array 415 includes twenty magnetic sensors 420. Each of the magnetic sensors 420 detects magnetic flux associated with the permanent magnets 410 when the magnetic sensors 420 are in proximity to the permanent magnets 410. This detection results in a detected area 440 of the sensor array 415. The magnetic flux that is detected by the magnetic sensors 420 varies with the position of the permanent magnets with respect to the sensors 420. For example, if one of the permanent magnet 410 is located directly above a magnetic sensor 420, the sensor 420 will detect a maximum or peak magnetic flux from the permanent magnet 410. However, as the permanent magnets 410 moves away from such a position, the magnetic flux that is detected by the sensor 420 decreases. Based on the magnetic flux sensed by each of the magnetic sensors 420, the controller 200 can determine a center of a magnetic sensor path (e.g., a centerline of the plurality of magnets 445) within the detected area 440. The controller 200 then determines the inclination of the component 405 (e.g., with respect to the x-axis 430 and the y-axis 435) depending on where the center of the magnetic sensor path is on the sensor array 415. For example, the inclination is calculated or determined by the controller 200 based on a slope of the magnetic sensor path and an orientation of the sensor array 415. Additionally or alternatively, the position of each of the magnetic detectors or magnetic sensors is known, and depending on which of the detectors or sensors detected the greatest magnetic fluxes, the controller 200 can calculate or determine the inclination of the component 405.

FIGS. 5A-5F illustrate a variety of different sensor configurations for the circular magnetic sensor array 415. In FIG. 5A, a circular magnetic sensor array 415A includes four magnetic sensors 450 arranged symmetrically about the sensor array 415A. In FIG. 5B, a circular magnetic sensor array 415B includes three sensors 455, and in FIG. 5C, a circular magnetic sensor array 415C includes two sensors 460. Each of the circular magnetic sensor arrays 415A, 415B, and 415C includes sensors that are adjacent one another. Although the circular magnetic sensor arrays 415A, 415B, and 415C only include 4, 3, and 2 magnetic sensors, respectively, the circular magnetic sensor array 415 can include a greater number of magnetic sensors. For example, the circular magnetic sensor array 415 can include between one sensor and twenty sensors (as shown in FIG. 4). In other embodiments, the circular magnetic sensor array 415 can include more than twenty magnetic sensors (e.g., between 20 and 1000 sensors based on the desired level of precision for the inclination determination). A circular magnetic sensory array 415D of FIG. 5D includes sixteen circular magnetic sensors 465 spaced around the array 415D (e.g., evenly spaced apart). FIG. 5E illustrates a circular magnetic sensor array 415E that includes twenty bar-type magnetic sensors 470 spaced (e.g., evenly spaced apart) around the array 415E. FIG. 5F illustrates a circular magnetic sensor array 415F that includes 72 magnetic sensors 475 spaced apart (e.g., evenly based on row) in two rows around the sensor array. The greater the number of magnetic sensors that are included in the array 415, the greater the precision with which the system 400 is able to determine the angle of inclination of the component 405.

Figure 6A:
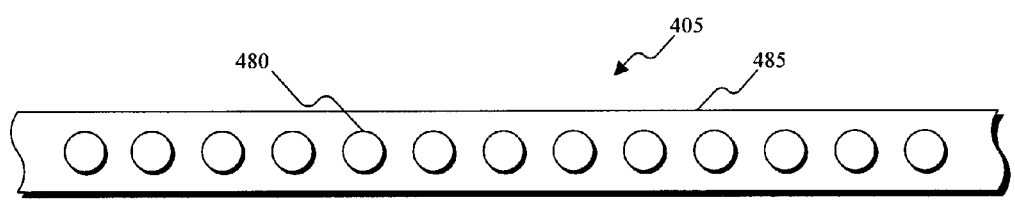
FIGS. 6A-6D illustrate permanent magnet arrays according to embodiments of the invention.
Figure 6B:
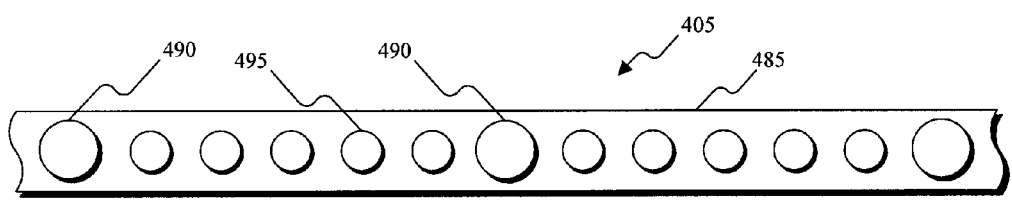

FIGS. 6A-6D illustrate various permanent magnet configurations for the component 405. FIG. 6A illustrates a plurality of permanent magnets 480 evenly spaced along a surface 485 of the component 405. Although the permanent magnets 480 illustrated in FIGS. 6A-6D are circular, magnets having other shapes can also be used (e.g., square-shaped magnets, rectangular-shaped magnets, etc.). Additionally, although the array of permanent magnets 480 in FIG. 6A can be used to determine the inclination of the component 405, the magnets 480 can also be used to determine, for example, the movement or extension of the component 405. In order to determine the extension of the component 405, the controller 200 (FIG. 4) determines which magnet is being detected by the array of sensors 415. In some embodiments, the magnets 480 in FIG. 6A can be counted by the controller 200 as they are being detected by the sensor array 415. When the component 405 moves in a first direction, the magnet count can be increased. When the component 405 moves in a second direction the magnet count can be decreased. Additionally or alternatively, magnets having varying magnetic field strengths or magnetic dipole moments can be used to identify portions of the component 405. For example, every tenth permanent magnet 480 can have an increased or decreased magnetic field strength. This allows the controller 200 to identify the extension of the component 405 without keeping track of each magnet that passes the sensor array. FIG. 6B illustrates an embodiment of the component 405 that includes permanent magnets of varying size. The larger permanent magnets 490 can be used to identify specific portions of the component 405. When the controller 200 senses the transition from the magnetic flux associated with the larger magnets 490 (e.g., the flux being detected by more detectors 425) to the flux from a smaller magnet 495 (e.g., the flux being detected by fewer detectors 425), or vice versa, the controller 200 is able to identify a particular portion of the component 405.

Figure 6C:
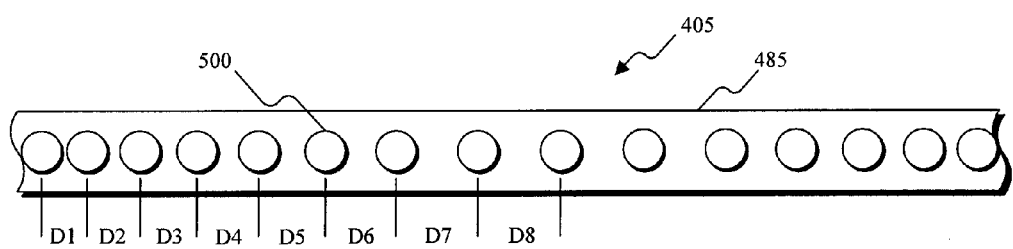
Figure 6D:
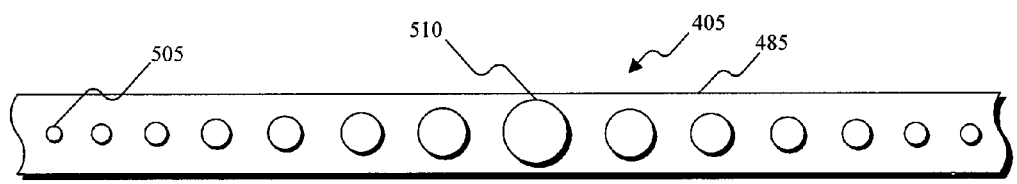

FIG. 6C illustrates an embodiment of the component 405 that includes permanent magnets 500 having varying distances, D, between them. For example, the distances between the respective centers of the first nine permanent magnets 500 are gradually increased along the surface 485 of the component 405 from a distance, D1, up to a distance, D8. In some embodiments, the distances can then be correspondingly decreased. Because the resulting gaps between the permanent magnets 500 will be detected by the sensor array 415 as a reduction in detected magnetic flux (or a lack of magnetic flux), the controller 200 can compare the reduction in detected magnetic flux to known relative sizes of the distances between the permanent magnets 500 to identify a particular portion of the component 405. FIG. 6D illustrates an embodiment of the component 405 that includes permanent magnets of varying sizes. For example, the magnets range in size from small magnets 505 to large magnets 510, and the size of the magnets can gradually increase along the length of the component 405. As the magnets become larger, the magnetic flux associated with the magnets is detected by more detectors 425 in the sensors 420. Because the magnets can be evenly spaced, the size of the area where magnetic flux is detected for each magnet can be compared in a relative way to the size of the area where the magnetic flux is detected for the magnets adjacent to it. Based on this comparison, the controller 200 can identify a particular portion of the component 405. The permanent magnet arrays shown in and described with respect to FIGS. 6A-6D can also be used to determine, for example, the direction of motion of the component 405, the speed of movement of the component 405, the acceleration of the component 405, etc., in addition to being used to determine position or inclination.

Figure 7:
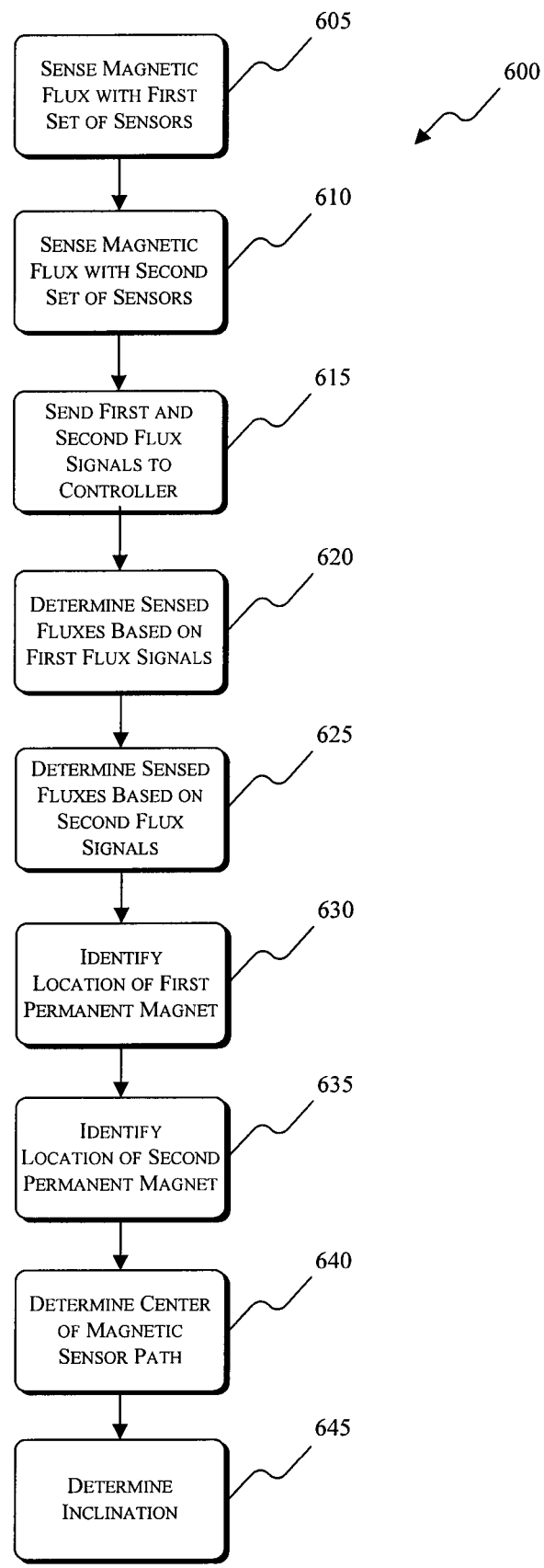
FIG. 7 illustrates a process for determining the inclination of a component of an industrial machine according to an embodiment of the invention.

FIG. 7 illustrates a process 600 for determining the inclination of a component of the industrial machine 10 using permanent magnets. A first of the magnetic sensors 420 senses the magnetic flux associated with a first permanent magnet and a first set or group of detectors (e.g., the magnetic detectors associated with the first of the magnetic sensors) (step 605). A second of the magnetic sensors 420 senses the magnetic flux associated with a second permanent magnet and a second set or group of detectors (e.g., the magnetic detectors associated with the second of the magnetic sensors) (step 610). The first and second of the magnetic sensors 420 generate first and second flux signals, respectively, related to the fluxes sensed by each of the sensors. In some embodiments, the flux signals correspond to each of the detected fluxes for each of the magnetic detectors in a given magnetic sensor 420. In other embodiments, the flux signals correspond to an average of the fluxes detected by the magnetic detectors in a given magnetic sensor 420. The first and second flux signals are then sent to and received by the controller 200 (step 615). Based on the first flux signal, the controller 200 determines values for the flux sensed by the first magnetic sensor (e.g., for each of the magnetic detectors in the first magnetic sensor) (step 620). Based on the second flux signal, the controller 200 determines values for the flux sensed by the second magnetic sensor (e.g., for each of the magnetic detectors in the second magnetic sensor) (step 625).

The flux values associated with the first magnetic sensor are then analyzed to identify a location of a first permanent magnet (step 630). For example, the flux values are analyzed and mapped or grouped based on relative magnitude. In some embodiments, each magnetic sensor or each of the magnetic detectors represents a point on a map of magnetic flux. The relative values of adjacent points in the map of magnetic flux can then be used to determine the inclination of the component 405. In other embodiments, a table of magnetic flux values is populated, and each flux value has a corresponding location within the array of magnetic sensors. Knowing the location of each flux value, the magnitude of each flux value, and an orientation of the array of magnetic sensors, the orientation or inclination of the component 405 can be determined. For example, the greater the magnitude of the sensed flux, the closer the detector was to the permanent magnet. The controller 200 can compare each of the flux values to one or more threshold values to identify a location (e.g., an area) of or center (e.g., a point) of the permanent magnet. In some embodiments, the controller 200 identifies a peak or maximum flux value associated with the sensor and uses the location of the peak flux value as the location of the permanent magnet. For example, a circular permanent magnet will have characteristic peaks of magnetic flux measured by the detectors directly above or in close proximity to, for example, a pole of the permanent magnet. The detectors that are spaced further apart from the permanent magnet will sense less magnetic flux and can be used to determine a boundary of the permanent magnet. The sensed flux values for the second magnetic sensor are then analyzed to identify a location of a second permanent magnet or a peak magnetic flux associated with the second permanent magnet (step 635) in a manner similar to that described with respect to step 630. The controller 200 determines a center of a magnetic sensor path or a centerline of the permanent magnets based on the locations of or peak fluxes associated with the first and second permanent magnets (step 640). As described above, the center of the magnetic sensor path and the orientation of the circular magnetic sensor array can then be used to determine the angle of inclination of the component 405 (step 645).

Thus, the invention provides, among other things, systems, methods, and devices for determining the inclination of a component of an industrial machine using a permanent magnet inclinometer. Various features and advantages of the invention are set forth in the following claims.

What is claimed is:

1. A method of determining an inclination of a component of an industrial machine, the component of the industrial machine being independently movable in a linear manner and a rotary manner, the method comprising:

sensing a first magnetic flux associated with a first magnetic sensor;

sensing a second magnetic flux associated with a second magnetic sensor;

generating a first flux signal related to the first magnetic flux and a second flux signal related to the second magnetic flux;

analyzing the first flux signal to identify a first peak magnetic flux;

analyzing the second flux signal to identify a second peak magnetic flux;

identifying a magnetic sensor path based on the first peak magnetic flux and the second peak magnetic flux; and determining the inclination of the component of the industrial machine based on the identified magnetic sensor path.

2. The method of claim 1, wherein the component of the industrial machine is a dipper handle.

3. The method of claim 1, further comprising receiving the first flux signal and the second flux signal at a controller.

4. The method of claim 1, wherein the first peak magnetic flux is associated with a first location for a first permanent magnet, and the second peak magnetic flux is associated with a second location for a second permanent magnet.

5. The method of claim 1, wherein the first magnetic sensor includes a first plurality of magnetic detectors and the second magnetic sensor includes a second plurality of magnetic detectors.

6. The method of claim 5, wherein the first flux signal corresponds to a detected flux for each of the plurality of magnetic detectors in the first magnetic sensor, and the second flux signal corresponds to a detected flux for each of the plurality of magnetic detectors in the second magnetic sensor.

7. The method of claim 6, wherein analyzing the first flux signal and the second flux signal includes mapping the detected flux for each of the plurality of magnetic detectors in the first magnetic sensor and the detected flux for each of the plurality of magnetic detectors in the second magnetic sensor.

* * * * *